United States Patent [19]

Brodell et al.

[11] 4,184,689
[45] Jan. 22, 1980

[54] SEAL STRUCTURE FOR AN AXIAL FLOW ROTARY MACHINE

[75] Inventors: Robert F. Brodell, Brattleboro, Vt.; Robert A. Johnson, Glastonbury; Trent H. Holmes, Rocky Hill, both of Conn.

[73] Assignee: United Technologies Corporation, Hartford, Conn.

[21] Appl. No.: 948,290

[22] Filed: Oct. 2, 1978

[51] Int. Cl.² .................... F01D 25/26; F16J 15/54
[52] U.S. Cl. .................................. 277/26; 285/224; 415/134
[58] Field of Search ..................... 285/224, 187; 415/134–139; 277/26, 30

[56] References Cited

U.S. PATENT DOCUMENTS

| | | | |
|---|---|---|---|
| 2,772,069 | 11/1956 | Hockert et al. | 415/134 |
| 2,838,275 | 6/1958 | Harris et al. | 415/137 |
| 2,903,237 | 9/1959 | Petrie et al. | 415/138 |
| 2,937,000 | 5/1960 | Ledwith | 415/137 |
| 2,968,467 | 1/1961 | McGregor | 415/136 |
| 2,996,279 | 8/1961 | Lorett et al. | 415/134 |
| 3,018,085 | 1/1962 | Welsh | 415/136 |
| 3,179,423 | 4/1965 | McCloud | 277/30 |
| 3,519,366 | 7/1970 | Campbell | 415/138 |
| 3,747,943 | 7/1973 | Dietzel et al. | 277/30 |
| 3,807,891 | 4/1974 | McDow | 415/138 |

FOREIGN PATENT DOCUMENTS 853997 4/1957 United Kingdom ............... 415/138

*Primary Examiner*—Robert I. Smith
*Attorney, Agent, or Firm*—Gene D. Fleischhauer

[57] ABSTRACT

A seal structure between a circumferentially extending array of stator vanes and an outer case is disclosed. Various construction details that allow the seal structure to accommodate differences in axial and radial growth between the outer case and the vane array are developed. A continuous ring disposed between the vane array and the outer case cooperates with a first seal member to block leakage of working medium between the ring and the vane array. The continuous ring cooperates with a second seal member to block leakage of the working medium between the ring and the outer case.

5 Claims, 3 Drawing Figures

SEAL STRUCTURE FOR AN AXIAL FLOW ROTARY MACHINE

BACKGROUND OF THE INVENTION

1. Field of the Invention

This invention relates to gas turbine engines and more particularly to structures for sealing between an array of stator vanes in a circumscribing engine case.

2. Description of the Prior Art

Gas turbine engines of the type to which the present invention applies principally comprise a compression section and a turbine section. In such engines a rotor assembly extends axially through the compression and turbine sections and is circumscribed by an engine case. Rows of rotor blades extend outwardly from the rotor in both the compression and the turbine sections. An array of stator vanes extends inwardly from the engine case at the upstream end of each blade row to direct the working medium gases of the engine to a preferred angle of entry into the downstream row of rotor blades. Leakage of working medium gases around the array of stator vanes, such as between the vane array and the engine case, degrades engine performance and is to be avoided.

Various approaches to the problem of avoiding leakage between each array of stator vanes and the engine case have been addressed in the prior art. In one typical engine structure described in U.S. Pat. No. 2,942,844 to Neate entitled "Turbine Nozzle", a metal braid is mounted in a channel between the outer case and the array of stator vanes.

In other engine structures, such as that illustrated in U.S. Pat. No. 3,807,891 to McDow et al entitled "Thermal Response Turbine Shroud", vanes and shrouds are aerodynamically loaded against each other during operation to control leakage around the arrays of vanes by eliminating axial gaps. As shown in U.S. Pat. No. 2,915,280 to Sonder entitled "Nozzle and Seal Assembly", an array of stator vanes is assembled into a unit and placed in the engine in one piece. U.S. Pat. No. 3,765,791 to Trappmann uses an annular piston and piston rings to seal a back pressure cavity. A tongue extends from an outer shroud ring to engage a groove in the piston to block leakage of the working medium in a downstream direction between the piston and the array of stator vanes.

In recent years the need to produce energy efficient machines has grown with increases in fuel costs and the scarcity of fuel supplies. Because the leakage of the working medium between an array of stator vanes and the outer case decreases engine efficiency, research efforts are still directed at developing effective seals therebetween.

SUMMARY OF THE INVENTION

A primary object of the present invention is to improve the operating efficiency of an axial flow rotary machine. Another object is to provide an effective seal between an array of stator vanes and an outer case to block leakage of the working medium gases around the array of stator vanes. Further objects are to provide a seal structure which is unaffected by distortions of the outer case and which accommodates differences in axial and radial growth between the array of stator vanes and the outer case.

According to the present invention a continuous ring supporting seal elements disposed between an array of stator vanes and an engine case is attached to the case at a spline-type connection.

A primary feature of the present invention is the ring. Splines extend outwardly from a continuous portion of the ring to engage the case. Other features are the T-seal member disposed between the continuous portion of the ring and the array of stator vanes, and the cylindrical seal disposed between the continuous portion of the ring and the case.

A principal advantage of the present invention is improved efficiency in machines incorporating the seal structure. The effectiveness of the seal structure and the fatigue life of elements forming the seal structure are enhanced by isolating the sealing surfaces from distortions in the outer case and by accommodating differences in growth between the seal structure, the array of stator vanes and the outer case.

The foregoing and other objects, features and advantages of the present invention will become more apparent in the light of the following detailed description of preferred embodiments thereof as discussed and illustrated in the accompanying drawing.

DESCRIPTION OF THE PREFERRED EMBODIMENT

A gas turbine engine embodiment of the invention is described. The concepts are equally applicable to gas generator and to free turbine components.

Figure 1:
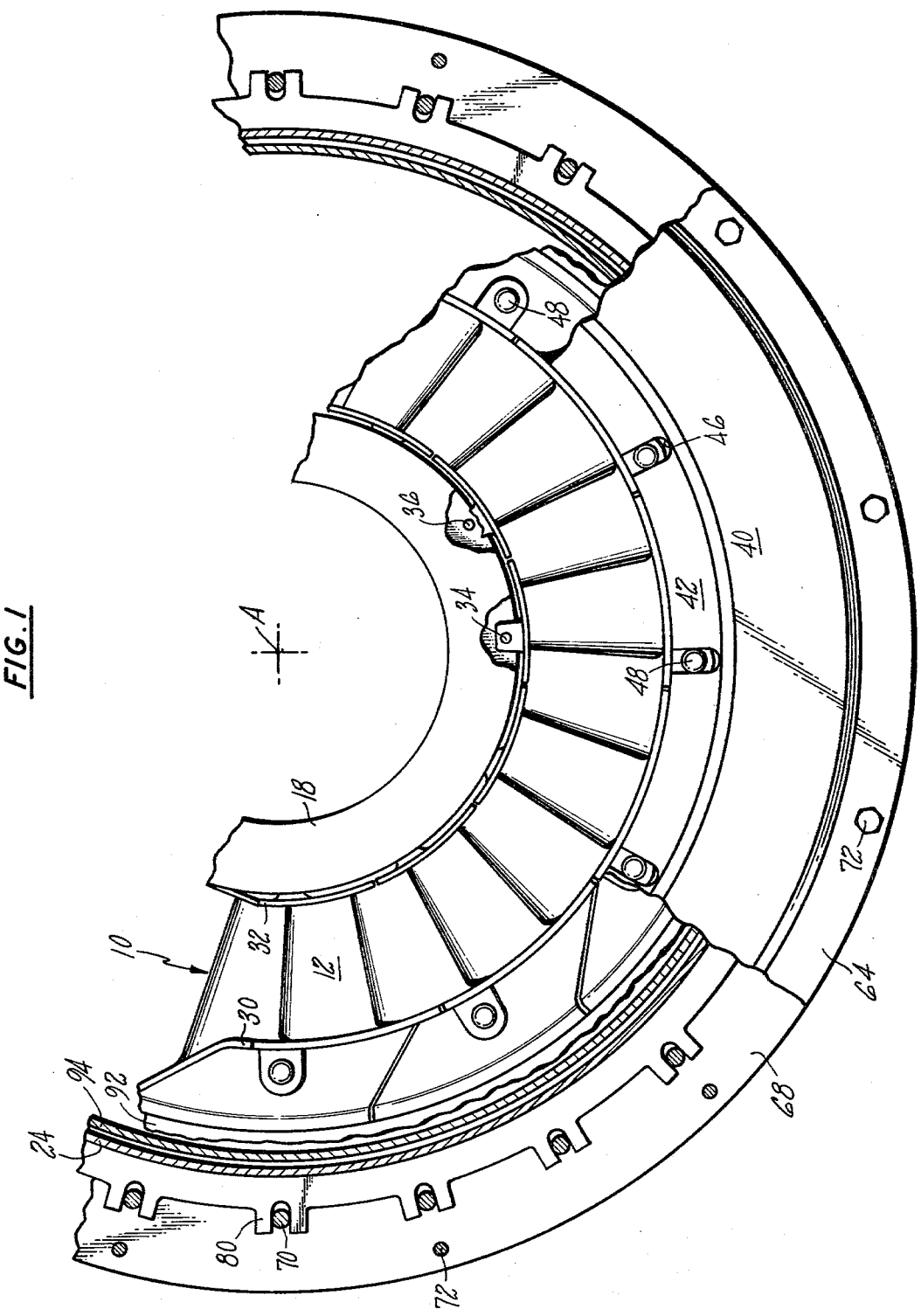
FIG. 1 is a partial cross section view of a stator looking in the aft direction with portions of the outer case broken away.

FIG. 1 illustrates a portion of an array 10 of stator vanes 12 circumferentially spaced about a central axis A. The vane array is formed of a plurality of clusters 14, each cluster having two vanes. The vanes of each cluster extend across a working medium flow path 16 between an inner case 18 and an outer case 20.

Figure 2:
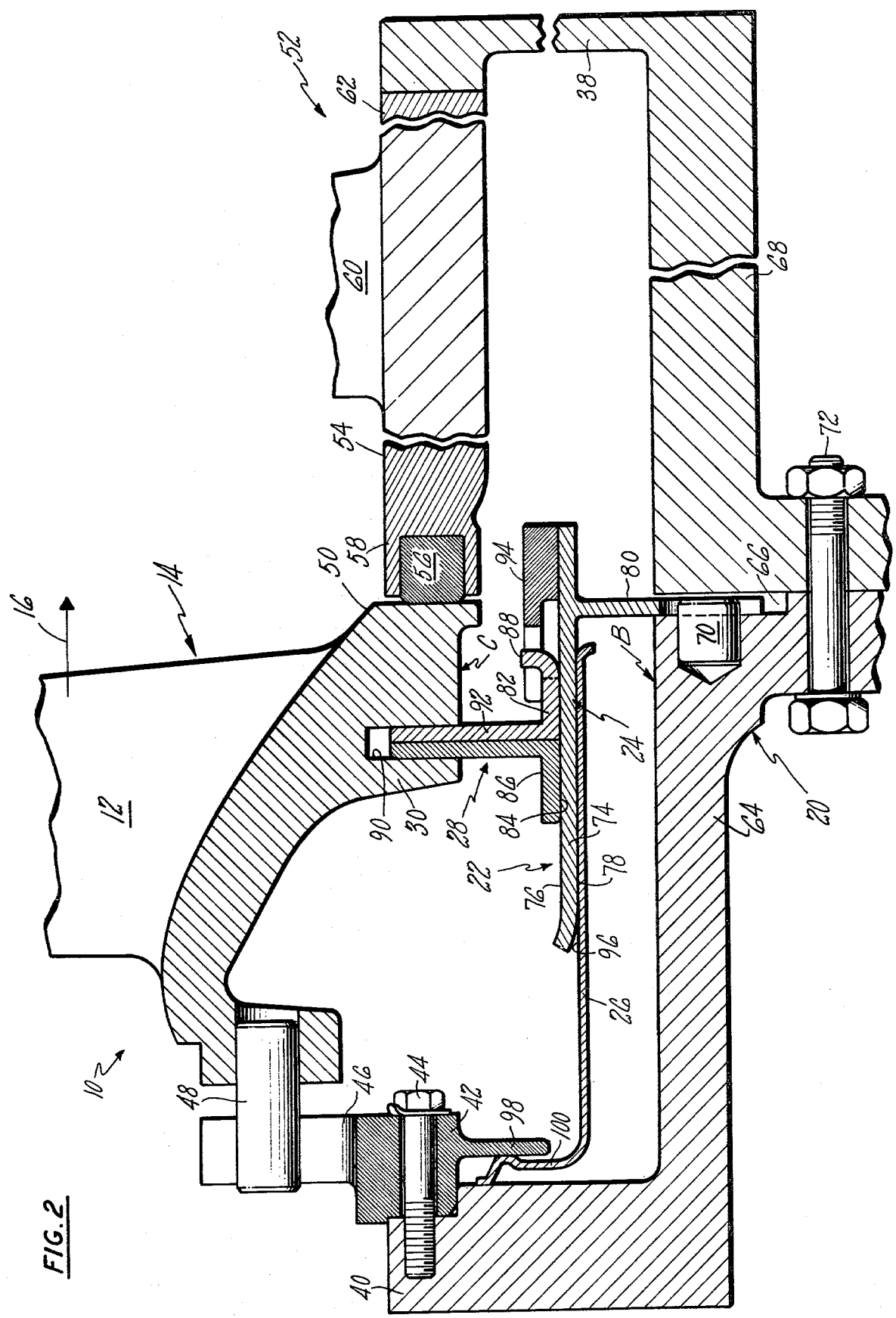
FIG. 2 is a sectional view taken along the line 2—2 as shown in FIG. 1.

As shown in FIG. 2, a seal structure 22 is disposed between a first component, such as the outer case 20, and a second component such as the array 10 of stator vanes. The first component has a first surface B generally opposing a second surface C on the second component. The seal structure is formed of: a support means, such as a ring 24; a first seal means, such as a T-seal member 28; and a second seal means, such as a cylindrical seal member 26. Each cluster 14 has an outer flange 30 and an inner flange 32. The inner flange of each cluster has an axially extending dowel 34. The inner case has a plurality of axially extending cups 36. Each cup is adapted to receive one of the dowels. The outer case has a downstream flange 38 and an upstream flange 40 extending inwardly from the outer case. A support ring 42 is attached to the upstream flange by a plurality of bolts 44. The support ring has a plurality of inwardly facing grooves 46.

The outer flange of each vane cluster has a pin 48 which extends axially from the outer flange to slidably engage one of the grooves 46 in the support ring. The outer flange also has a downstream end 50. A means for axial support 52 having an upstream end 54 adjoins the downstream end of the outer flange and extends downstream to engage the outer case 20 at the downstream flange 38. A rear seal member 56 is disposed between the downstream end 50 of the outer flange and the upstream end 54 of the means for axial support. In one detailed embodiment, the means for axial support is formed of a first outer air seal 58, a downstream vane 60 and a second outer air seal 62.

The illustrated portion of the outer case 20 is formed of a first case member 64 having a circumferentially extending slot 66 and of a second case member 68. A plurality of pins 70 are spaced circumferentially about the first case member. Each pin extends rearwardly from the first case member across the slot 66 toward the second case member 68. The first case member 64 and the second case member 68 are joined together by a plurality of circumferentially spaced bolts 72.

The support means, such as the ring 24, of the seal structure 22 includes a first portion, such as a circumferentially continuous portion 74 having an inwardly facing surface 76 and an outwardly facing surface 78. A second portion, such as a plurality of splines 80, extends radially outward from the circumferentially continuous portion. Each pair of adjacent splines engages one of the pins 70 at the outer case 20.

A T-seal member 28 is contiguous to the inwardly facing surface 76 of the ring 24. The T-seal member has a circumferentially extending cap portion 82 having an outwardly facing cap surface 84 and an inwardly facing cap surface 86. A plurality of tangs 88 extend inwardly from the cap portion. A circumferentially extending groove 90 in each outer flange 30 faces outwardly toward the T-seal member. The T-seal member has an inwardly extending shank 92 which engages each circumferentially extending groove. The ring 24 has a plurality of tabs 94. Each tab extends between a corresponding pair of the tangs 88 on the T-seal member and extends onto the inwardly facing cap surface 86.

The cylindrical seal member 26 is disposed between the continuous portion 74 of the ring and the outer case and has an inwardly facing surface 96. The inwardly facing surface opposes the outwardly facing surface 78 of the ring 24. The cylindrical seal member 26 extends in a substantially axial direction along the ring 24 toward the upstream flange 40 and the support ring 42. The support ring 42 has an outwardly extending rim 98 which is essentially parallel to the upstream flange 40. The cylindrical seal member 26 has an inwardly extending lip 100 which is slidably trapped between the upstream flange 40 of the case and the rim 98 of the support ring.

Figure 3:
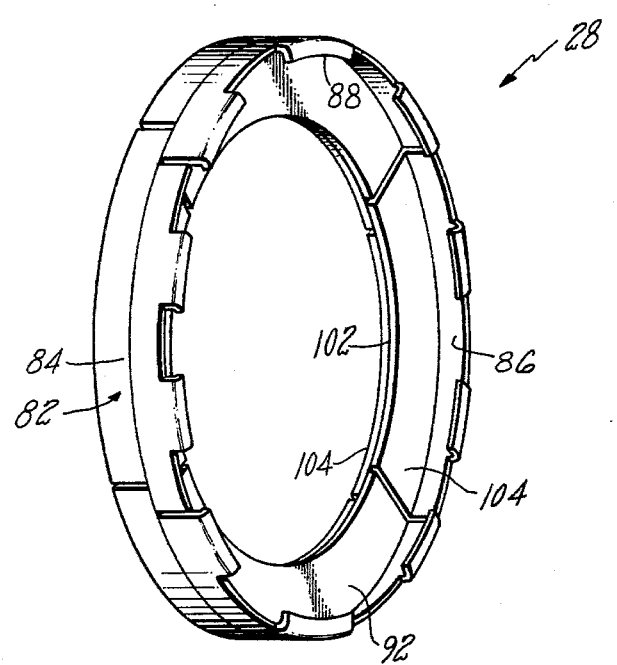
FIG. 3 is a perspective view of a fragment of the seal structure.

FIG. 3 shows a detailed embodiment of the T-seal member 28. The T-seal member is formed of four arcuate segments 102. Each arcuate segment is formed of two L-shaped members 104 joined together back-to-back such that each L-shaped member of one arcuate segment overlaps the adjacent L-shaped member.

During operation of the gas turbine engine described, hot working medium gases flow axially into a turbine section of the engine. Components of the turbine in intimate contact with the hot gases are heated rapidly and experience rapid thermal growth. Examples of such components are the array 10 of vanes 12 and the seal structure 22. Other components of the turbine, such as the turbine outer case 20, are remotely located from the gas stream and have a high thermal capacitance with respect to the vanes and the seal structure. The outer case responds more slowly than does the array of stator vanes and the seal structure.

Initially, heating of the turbine members causes each vane cluster 14 to grow outwardly toward the outer case. The outer end of each cluster slides outwardly in one of the grooves 46 and on the T-seal member 28 to accommodate the outward growth. As equilibrium conditions are approached, heating causes the outer case 20 to grow outwardly from the vane clusters and the seal structure 22.

Cooling of the turbine members, such as during deceleration, causes each vane cluster 14 to shrink inwardly. The outer end of each vane cluster slides inwardly in one of the grooves 46 and on the T-seal member 28 to accommodate the inward shrinkage. As equilibrium conditions are approached, cooling causes the outer case 20 to shrink inwardly toward the array of stator vanes and the seal structure 22.

Differential growth between the seal structure and the outer case is accommodated by the spline connection. Each pin 70 of the spline connection slides between the adjacent pair of splines 80 of the ring 24. The spline-pin engagement enables the outer case to support the ring 24 in the engine notwithstanding the differences in thermal growth between the ring and the case. The concentricity of the ring with respect to the central axis A is unaffected by movement of the case. The ring positions the cylindrical seal member 26 and prevents the seal member from moving with the case. The lip 100 of the seal member slides inwardly and outwardly between the upstream flange 40 of the case and the rim 98 of the support ring 42.

The seal structure 22 prevents the leakage of medium gases between the array of stator vanes and the outer case under all operating conditions of the engine. The cylindrical seal member 26 blocks leakage between the ring 24 and the upstream flange 40 of the outer case. The lip 100 on the cylindrical seal member is slidably trapped between the upstream flange 40 and the rim 98 of the support ring to block upstream leakage. The inwardly facing surface 96 of the seal member 26 opposes the outwardly facing surface 78 of the ring to block leakage at the downstream end. The cylindrical seal member is slidable on the ring 24 to accommodate axial growth of the outer case between the upstream flange 40 and the slot 66.

The T-seal member 28 blocks leakage of the working medium between each vane cluster 14 and the ring 24. At the inner end, leakage is blocked by the shank 92 which slidably engages the groove 90 in each flange. At the outer end, the outwardly facing cap surface 84 of the T-seal member contacts the inwardly facing surface 76 of the ring to block the leakage of working medium therebetween. T-seal member 28 is slidable on the continuous ring to accommodate axial movement between each vane cluster 14 and the ring 24. The tab 94 on ring 24 prevents inward movement of the segmented T-seal members. Circumferential movement is prevented by engagement of the tab with tang 88.

Each vane cluster adjusts rearwardly in response to gas pressure loading on the vanes. The downstream end 50 of each vane outer flange 30 presses against the rear seal member 56 of the first outer air seal to block leakage of the working medium from the flow path 16. The means 52 provides axial support to the vane cluster 14 at the outer flange 30. The inner case provides axial support to the vane cluster by the cup 36 and pin 48 engagement.

FIG. 3 shows the cooperation in the T-seal member 28 of each arcuate segment with the adjacent arcuate segments. Each segment circumferentially overlaps the adjacent segments to show a solid face to the working medium while permitting expansion and contraction of the ring with respect to the vane array.

Thus a seal structure is provided which is independent of the vane support structure and is unaffected by distortions of the outer case. The seal structure accommodates differential axial and radial growth between the array of stator vanes and of the outer case.

Although this invention has been shown and described with respect to a preferred embodiment thereof, it should be understood by those skilled in the art that various changes and omissions in the form and detail thereof may be made therein without departing from the spirit and scope of the invention.

Having thus described a typical embodiment of our invention, that which we claim as new and desire to secure by Letters Patent of the United States is:

1. A seal structure of the type disposed between a nonrotating first component having a first surface and a nonrotating second component having a second surface to block the flow of a medium therebetween, which comprises:
   a support means adapted for mounting between the first and second components wherein the support means has
      a first portion adapted to extend parallel to the first surface, and
      a second portion adapted to slidably engage the first component both to support the support means in a direction essentially normal to the first surface and to enable relative movement between the support means and the first surface in a direction essentially normal to the first surface;
   a first seal means adapted to extend between the support means and the second component, and having
      a first end which slidably engages the support means and a second end adapted to slidably engage, in a direction normal to said engagement at the first end, the second component, and
   a second seal means adapted to extend between the support means and the first surface.

2. The invention according to claim 1 wherein the second seal means has a first end which slidably engages the support means and a second end which is adapted to slidably engage, in a direction normal to said engagement at the first end, the first component.

3. The invention according to claim 1 or 2 for a rotary machine utilizing a seal structure of the type that blocks the leakage of working medium between an outer case which has a surface and which has a part of a means to form a spline-type connection, and an array of stator vanes which has a surface wherein:
   the support means is an axially extending ring adapted for mounting between the array of stator vanes and the outer case, the first portion of the support means is a continuous portion, and the second portion is a part of a means for forming a spline-type connection at the outer case;
   the first seal means is a first seal member adapted to extend between the ring and the array of the stator vanes, wherein
      the first end extends in the axial direction and slidably engages the ring, and
      the second end extends in the radial direction and is adapted to slidably engage a portion of the vane array,
   the second seal means is a second seal member adapted to extend between the ring and the outer case, wherein
      the first end slidably engages the ring, and
      the second end is adapted to slidably engage in a direction normal to said engagement at the first end, the outer case.

4. The invention according to claim 3 wherein:
   the first end of the first seal member slidably engages the ring in the axial direction and the second end of the first seal member is adapted to slidably engage in the radial direction a portion of the array of stator vanes; and
   the first end of the second seal member slidably engages the ring in the axial direction and the second end of the second seal member is adapted to slidably engage in the radial direction the outer case.

5. The invention according to claim 4 wherein:
   the continuous portion of the axially extending ring has a ring surface that faces inwardly;
   the first end of the first seal member has a cap and the cap has an outwardly facing cap surface and an inwardly facing cap surface; and
   the continuous portion has a plurality of tabs extending in an essentially axial direction which have a first end attached to the continuous portion, a second end inwardly spaced from the inwardly facing ring surface, and an outwardly facing tab surface between the first end and the second end such that the inwardly facing cap surface is opposed by the outwardly facing tab surface and the inwardly facing ring surface opposes the outwardly facing cap surface.

* * * * *